United States Patent [19]
Daly et al.

[11] Patent Number: 4,969,830
[45] Date of Patent: Nov. 13, 1990

[54] CONNECTION BETWEEN PORTABLE COMPUTER COMPONENTS

[75] Inventors: John J. Daly, San Carlos; James H. McNamara, Santa Cruz, both of Calif.

[73] Assignee: GRID Systems Corporation, Fremont, Calif.

[21] Appl. No.: 364,919

[22] Filed: Jun. 12, 1989

[51] Int. Cl.⁵ ..................... H01R 13/428; H05K 7/10; H01H 9/20
[52] U.S. Cl. .................. 439/136; 200/50 A; 439/341; 439/347; 439/928
[58] Field of Search ............... 439/338, 341, 345, 347, 439/353–358, 372, 326, 136, 137, 928; 361/392–397, 399; 455/89, 349; 200/50 A, 51.09

[56] References Cited

U.S. PATENT DOCUMENTS

| | | | |
|---|---|---|---|
| 3,209,301 | 9/1965 | Duffy, Jr. | 200/50 A |
| 3,728,664 | 4/1973 | Hurst | 431/341 |
| 3,959,790 | 5/1976 | Schuyler | 200/50 A |
| 3,969,796 | 7/1976 | Hodsdon et al. | 439/372 |
| 4,389,551 | 6/1983 | Deibele et al. | 200/51.09 |
| 4,528,429 | 7/1985 | Dobson et al. | 200/51.09 |

Primary Examiner—Neil Abrams
Attorney, Agent, or Firm—Townsend & Townsend

[57] ABSTRACT

A hand held portable computer is secured to a peripheral computer component or expansion module in a snap-on arrangement which automatically effects engagement of bus connectors between the two components. The hand held computer has four openings in its back or under side. Two of the slot-like openings have fittings within them or are so shaped as to receive L-shaped or hook-shaped brackets of the peripheral component. The brackets may be inserted in the slot openings when the computer and the expansion module are held obliquely angled with respect to each other. The computer is then swung down until its back or under side engages against the top of the peripheral component, whereupon a pair of protruding hook members extending at the top surface of the peripheral component engage the computer and snap into locking engagement in the adjacent slot openings. The bus connection is made when the two components are brought together.

14 Claims, 4 Drawing Sheets

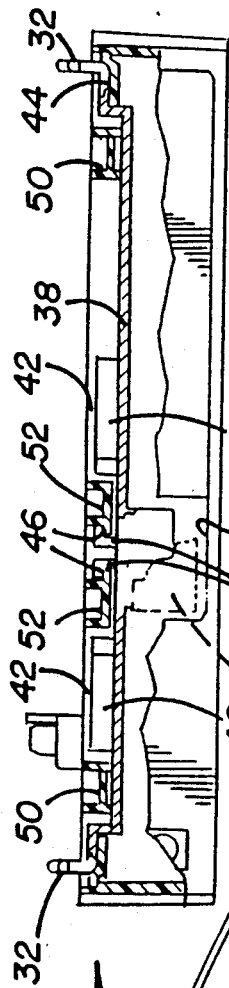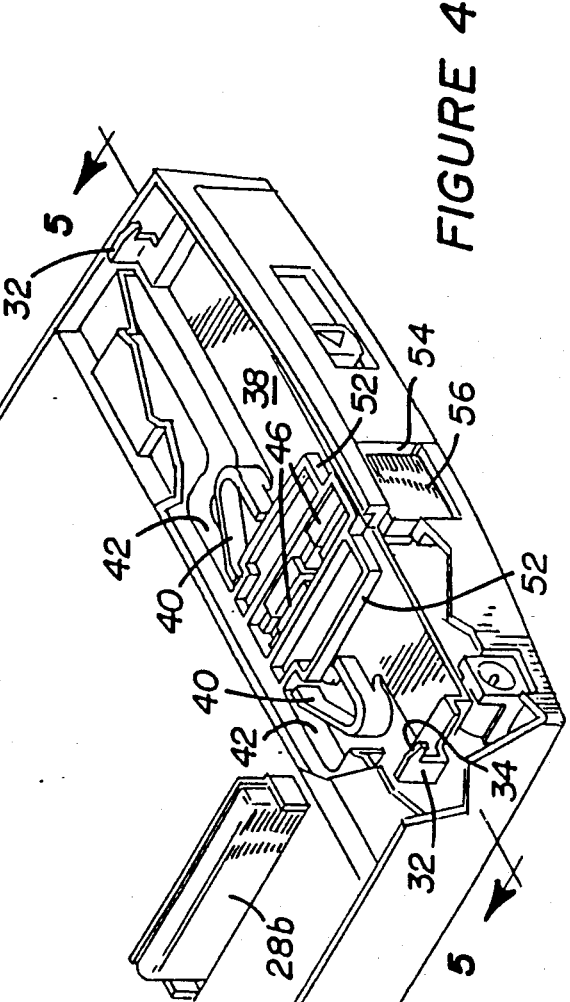

CONNECTION BETWEEN PORTABLE COMPUTER COMPONENTS

BACKGROUND OF THE INVENTION

This invention relates generally to connections between electronic equipment, particularly to the connection between a hand held portable computer and an expansion unit for the computer.

Hand held computers have been developed primarily for the recording of information during field work, in a vehicle or in other endeavors involving movement from place to place. Their uses have included use by delivery people recording the delivery or pick-up of inventory from a truck, use by inventory personnel in a warehouse or store, and other route type uses which could include reading of utility meters, etc. A copending application entitled "Hand Held Computer", filed concurrently with this application, assigned to the same assignee as the present invention and incorporated into this application by reference, discloses a hand held computer which has a large screen covering much of the area of the face of the computer, is thin in profile and light in weight and has no alphabetical or numerical keyboard. The hand held computer has a writing stylus or pen for writing on the screen, tethered to the computer housing by a cord which may carry a conductive wire, although in some applications no wire is needed.

On such a computer, or on another type of hand held or portable computer, it is sometimes necessary or desirable to connect the computer to a further component which will add more computing power, more random access memory (RAM), more disk storage or additional battery power. For example, it might be desirable to connect the clipboard computer to a peripheral or expansion module having a hard disk drive or perhaps one or more floppy disk drives, or the peripheral component may have a faster and more powerful main computing board and/or an additional battery pack. Often the connection to such an expansion module will be desirable and convenient after the clipboard computer has been brought back to an office or base operating point.

It is an object of the present invention to provide a connecting structure for attaching a hand held computer to a peripheral component which will add another feature or more battery power or computing power or disk memory, etc. in a way that unites the two components into essentially a single unit which is attractive and easily used, and in which the connection between the two components is very easily and reliably made.

SUMMARY OF THE INVENTION

In accordance with the present invention a hand held computer of the type described above is secured to an expansion module or peripheral computer component in a snap-on arrangement which automatically effects engagement of bus connectors between the two components. When thus connected, the expanded computer still is easily carried and held on one arm when writing on the write screen with the opposite hand, and without any protrusions which would interfere with this function. The bottom or back side of the computer is substantially flat and flush, with only two pairs of slotted openings in the back side.

The connection with the expansion module is made via the openings in the back side of the computer. Two of the slot-openings have fittings or are so shaped as to receive a pair of stationary L-shaped hooking elements or brackets which project upwardly from the top of the peripheral component or expansion module. These slotted openings may be laterally (horizontally) extending with their long dimensions on a common line. The stationary hooks on the component or expansion module are shaped accordingly.

The stationary brackets or hooks of the expansion module may be inserted into the slot openings when the two components are in an obliquely angled relationship to each other. The computer may then be swung down with the hooked brackets engaged, until its back or under side engages against the top of the expansion module. At this point, a pair of protruding locking hook members at the top surface of the expansion module engage another pair of slotted openings in the bottom of the clipboard computer. The hook members enter this second pair of slot-like openings, are forced to slide back by a camming action with the computer slot openings, and then are snapped into locking engagement with the slot openings under the force of a spring. As the two components are brought together, a bus connection is made between them.

The expansion module may have a configuration generally similar to that of the computer housing, and the two mating surfaces preferably are substantially flat, so that when the two components are mated together they appear as a single computer unit.

It is therefore among the objects of the present invention to provide a relatively simple and efficient connection between a hand held computer to an expansion module in such a way that the connection is made quickly and efficiently, an electrical bus connection is made automatically during the connection, and the united components tend to appear as a single computer unit.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIG. 4 is a perspective view showing the expansion module disconnected from the computer, and particularly illustrating the top surface of the module.

FIG. 5 is a sectional elevation view, generally as seen along the line 5—5 of FIG. 4 and illustrating connection members of the expansion module.

DESCRIPTION OF PREFERRED EMBODIMENTS

Figure 1:
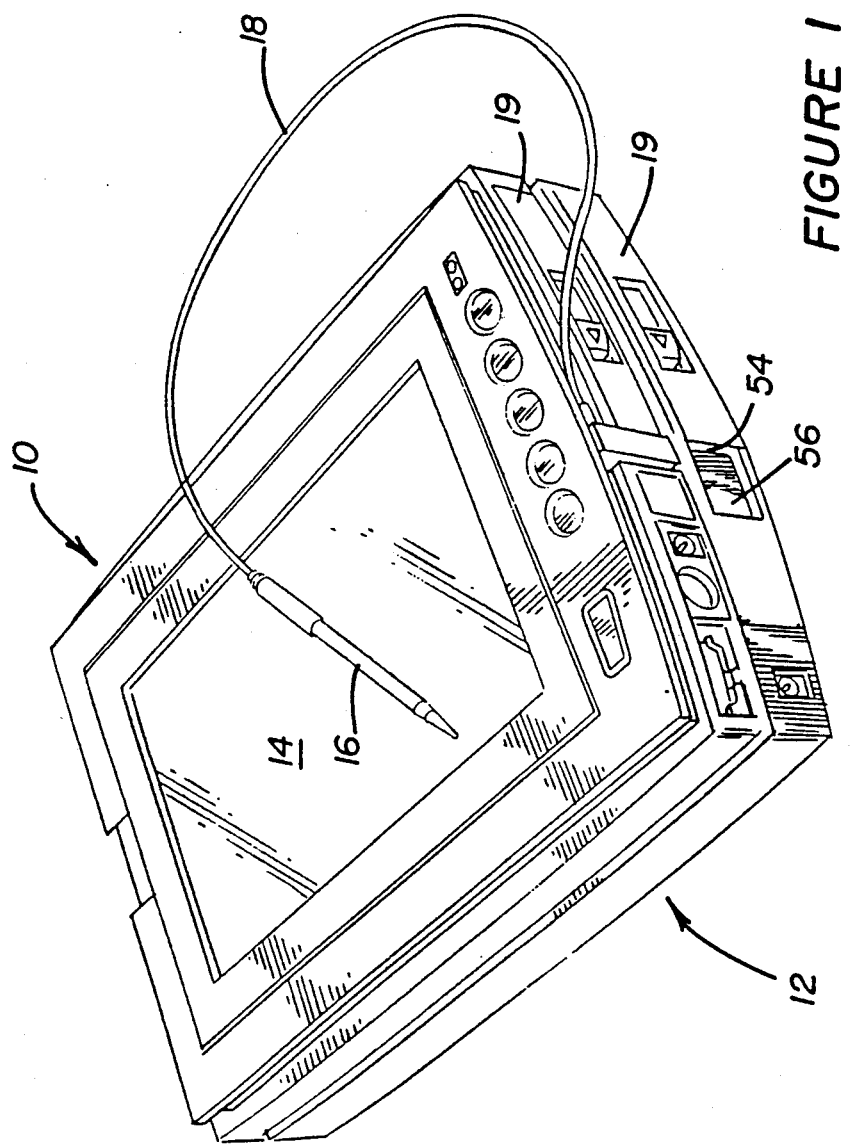
FIG. 1 is a perspective view showing a hand held computer as secured to a peripheral component or expansion module just below the computer, in accordance with the principles of the present invention.

In the drawings, FIG. 1 shows a hand held computer 10. The computer 10 may be generally of the type disclosed in the above referenced co-pending application entitled "Hand Held Computer." Generally, but not necessarily, such a computer will be portable, with limited battery or active or storage memory, with the need to periodically connect the computer to an expansion module. It should be understood, however, that the present invention encompasses any electronic device which may be connected to an expansion module to provide additional power, functions or features.

In FIG. 1, the computer 10 is shown connected to a peripheral component or expansion module 12 immediately beneath the computer. As illustrated, when these two components 10 and 12 are mated in accordance with the invention, they appear generally as a single computer unit. Both the under side of the computer 10 and the upper surface of the expansion module or component 12 preferably are substantially flat (or complementarily shaped), so that the two can be closely brought together in the mated position as illustrated.

Figure 2:
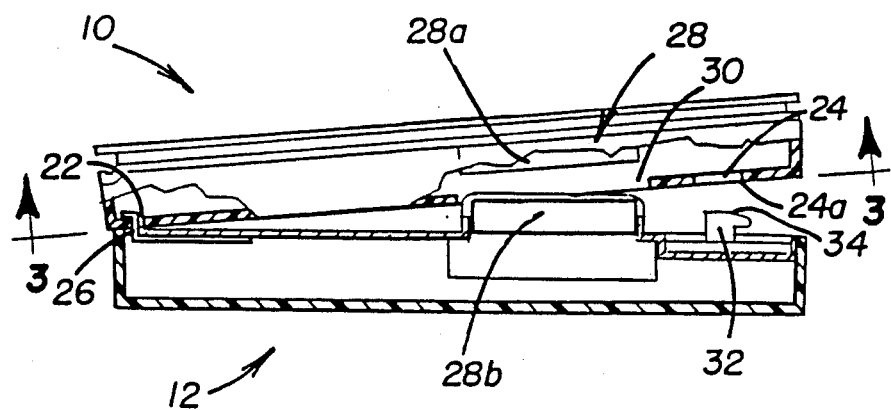
FIG. 2 is a schematic sectional elevation view showing the computer and the expansion module in a position wherein the expansion module is initially hooked into the bottom side of the computer, prior to the two being pivotally brought together.
Figure 3:
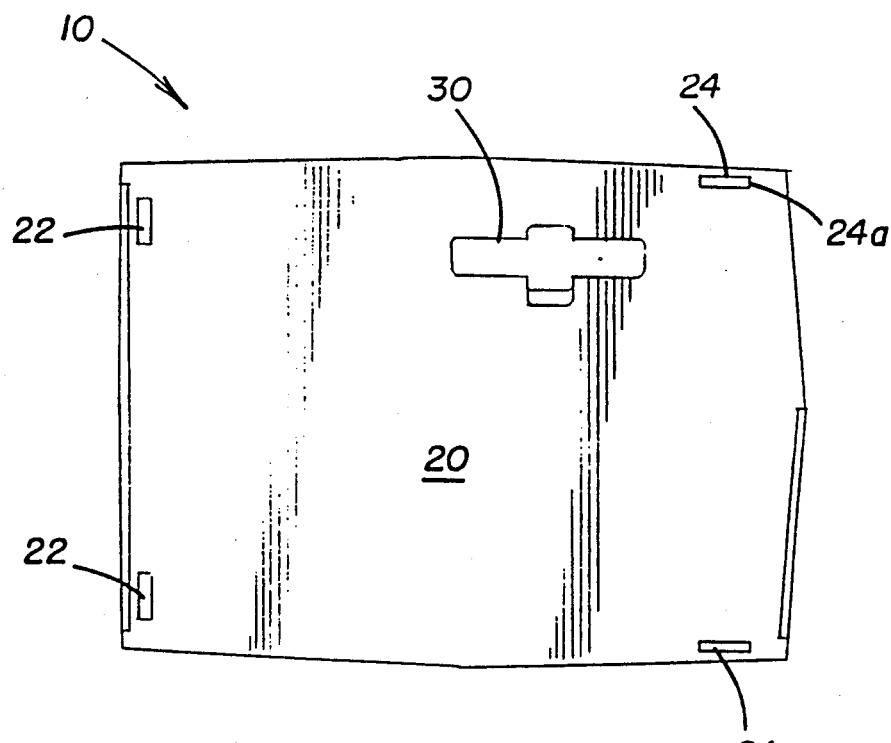
FIG. 3 is a plan view showing the back or under side of the computer, as seen along the line 3—3 in FIG. 2.

FIG. 2 shows schematically the connection system of the invention with which the computer 10 is attached to the expansion module or peripheral component 12. FIG. 2 should be viewed in conjunction with FIG. 3, which shows the bottom surface 20 of the computer 10, revealing two pairs of slotted openings 22 and 24. In FIG. 2 the computer 10 and the expansion module 12 are shown in an oblique relationship to each other, wherein a pair of stationary hooking elements 26 of the expansion module 12 are being hooked into the horizontal or lateral slotted openings 22 in the bottom of the computer 10. As can be envisioned in FIG. 2, in a preferred embodiment the hooking elements 26 will not enter the slotted openings 22 unless the two computer components 10 and 12 are tipped at a somewhat oblique angle with respect to each other.

As also shown schematically in FIG. 2, a bus connection 28 is automatically made as the computer 10 and the module 12 are pivotally brought together after engagement of the hooking elements 26. A multiple-contact bus connector 28a, positioned within a recess 30 within the bottom or under side 20 of the computer 10, is engaged with a mating multiple-contact bus connector 28b which protrudes upwardly from the expansion module 12. The recessed connector 28a in the computer enables the clipboard type computer 10 to be conveniently used alone, as for field use, without the obstruction of any protrusions at the under side of the computer.

Figure 6:
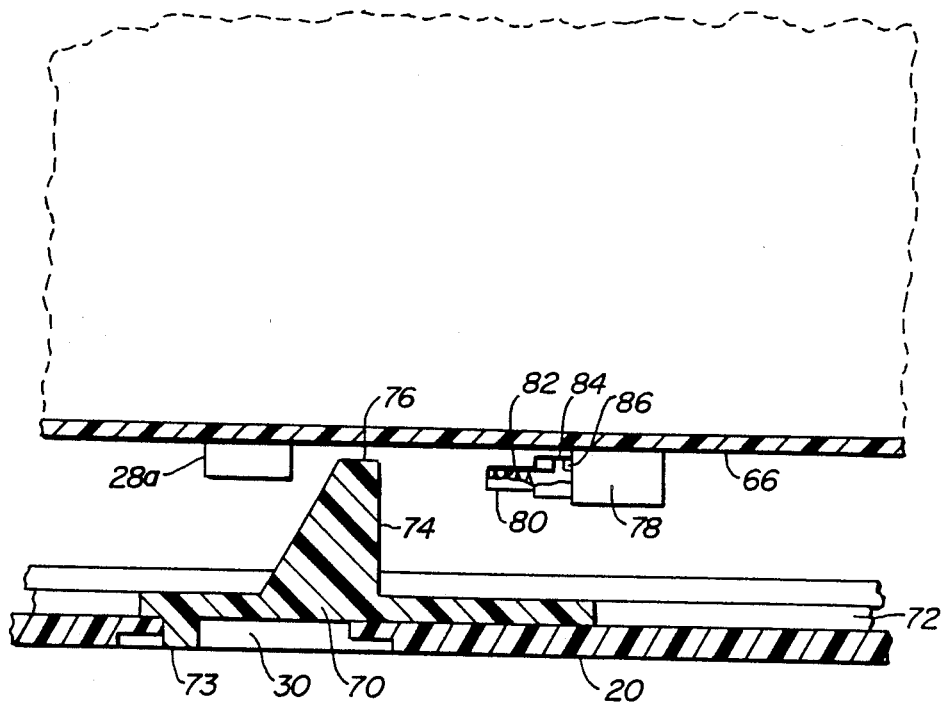
FIG. 6 is a sectional view of the recess door in its closed position.
Figure 7:
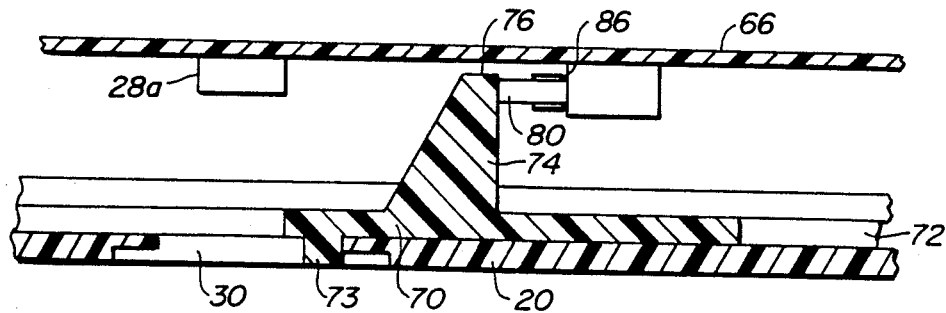
FIG. 7 is a sectional view of the recess door in its open position.

The computer may be provided with a protective door and deactivation switch as shown in FIGS. 6 and 7. The computer's main logic printed circuit board 66 lies within the computer adjacent under side 20. A movable door 70 is disposed in grooves 72 formed in under side 20. Door 70 slides in grooves 72 to open and close recess 30. A handle 73 extends downward from door 70 to facilitate movement of door 70 by the user.

Extending upward from door 70 toward circuit board 66 is a switch actuator 74. In the preferred embodiment, door 70, handle 72 and actuator 74 are formed as a unitary piece of injection molded plastic. The top surface 76 of actuator 74 lies adjacent circuit board 66 but far enough away to prevent contact between actuator 74 and any elements mounted on circuit board 66.

A switch 78 extends downward from circuit board 66 toward under side 20. Switch 78 is mounted in a position in which actuator 74 contacts and depresses activation button 80 on switch 78 when door 70 is opened more than halfway. In its activated position, switch 80 closes a contact (not shown) which causes the computer to change its operation state from "Active" to "Inactive", from "Run" mode to "Standby" mode, or from "On" to "Off." In "Standby" mode, the active programs and data are stored in RAM while the remainder of the computer is shut down. This change in operation state prevents damage to the computer and its data from transient voltages created when the peripheral equipment is attached to the computer.

As shown in FIG. 6, button 80 is biased by spring 82 to its non-activated position. Button 80 has a surface 84 which abuts a shoulder 86 formed on the housing of switch 78 to prevent movement of button 80 beyond its activated position. In the preferred embodiment, the total movement of button 80 from its non-activated position to its activated position is 0.052 inches.

FIG. 2 indicates the connection made to the slotted openings 24 at the opposite end of the computer bottom, as the computer 10 and expansion module 12 are brought into final proximity for engagement together. As illustrated, the expansion module 12 includes a pair of slidable hooks 32 which can be moved back and forth in a longitudinal direction of the expansion module 12. The slidable hooks 32 are moveable in unison and are spring loaded toward a latching position, i.e. to the right as seen in FIG. 2.

Immediately above the slidable hooks 32 are the longitudinally oriented slotted holes 24, as seen in FIG. 2. Further movement of the computer 10, swinging down against the top of the expansion module 12, will engage a ramp-like surface 34 of each of the slidable locking hook members 32 against an edge 24a of the longitudinal locking slot 24. The downward movement of the computer 10 will cam the slidable locking hooks 32 back toward a retracted position (to the left as seen in FIG. 2), so that the locking hooks clear the slot edge 24a and snap through the longitudinal slotted holes 24. The locking hooks 32 are then moved by the spring force to the right, locking over the computer bottom structure and firmly retaining the computer 10 and expansion module 12 closely together.

FIG. 4 shows the expansion module 12 with a preferred embodiment of a sliding hook/latching mechanism for the locking hooks 32. As shown in FIG. 4, the two locking hooks 32 may be formed integrally as part of a spring-loaded sliding bracket 38 which is slidable longitudinally within the expansion module 12. The bracket 38 may be an integral plastic member which also includes a pair of spring flanges 40 which engage against a wall-like surface 42 within the module 12 as illustrated. These spring flanges 40 provide an integral plastic spring which is constantly urging the locking hooks 32 toward the locking, engaged position.

FIG. 5 shows the sliding bracket member 38 in sectional view within the expansion module 12. As indicated, in its sliding motion it may ride on low friction surfaces 44 at outboard positions, and also on similar low friction glide surfaces 46 via a split-T shaped member 48 at an inboard position, preferably integral with the bracket 38 and between the plastic spring flange structures 40. Other structure 50 and 52 holds the relatively wide sliding bracket 38 down in the proper position against upward movement, as illustrated particularly in FIG. 5.

For release of the computer 10 from the expansion module 12, an opening 54 in the front edge of the module exposes a tab or button 56 which comprises a front face of the slidable bracket 38. Finger pressure on the tab 56 will push the bracket back against the force of the spring flanges 40 so as to retract the locking hooks 32 and permit separation of the components. In FIG. 4 the structure 56, 38 and 46 moves back together, relative to stationary structure 52 and 42. In FIG. 5 the tab or button 56 is shown in broken lines because it is in front of the plane of view.

It is therefore seen that the connection arrangement for a pair of computer components in accordance with the principles of the invention provides a simple and very efficient connection between the components, while at the same time effecting automatically a bus connection. The two components are mated so closely with the preferred connection structure that they can be made to appear as a single computer unit.

It should be understood that although two pairs of slots and hook members are shown and described in the illustrated locking arrangement, only one hook could be provided at one or both ends, so long as the components can be securely and tightly locked together.

While I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

We claim:

1. A releasable connection between a computer and an expansion module or peripheral component for the computer, for mating the computer and expansion module closely and connecting them together electrically, comprising, the computer having a bottom surface and the expansion module having an upper surface which are complementarily shaped to each other such that the two surfaces can be nested closely together, stationary hook means protruding from the upper surface of the expansion module near a first end of the expansion module, first hook receiving slot means in the lower surface of the computer, in position corresponding to the position of the stationary hook means of the expansion module, such that the stationary hook means and the hook slot means can be engaged when the computer and the module are nested together, at least one movable hook member protruding from the upper surface of the expansion module, near a second end of the module, said movable hook member being movable between an engaging position and a disengaging position, and spring means within the expansion module for biasing the movable hook member toward the engaging position, the spring means and the hook member forming an integral element, second hook receiving slot means in the bottom surface of the computer for receiving the movable hook member for camming the hook member from the engaging position toward the disengaging position as the computer and expansion module are pivoted together following engagement of the stationary hook means with the computer, and including means associated with the movable hook member and the second hook receiving slot means for spring-forcing the movable hook member into a locking position in engagement with the computer when the computer and the expansion module have been moved fully into a nested position, and bus connector means for automatically making a multiple-contact connection between the computer and the expansion module as the computer is brought into nesting contact with the expansion module.

2. The connection structure of claim 1, wherein the computer's bottom surface and the expansion module's upper surface are both substantially planar.

3. The connection structure of claim 1, wherein the stationary hook means comprise a pair of stationary hook members protruding from the expansion module, generally L-shaped as viewed from a side of the expansion module, and wherein the corresponding first hook receiving slot means in the bottom of the computer are so configured that the computer and the expansion module must be oriented obliquely with respect to one another in order to engage the stationary hook members into the corresponding slot means.

4. The connection structure of claim 1, including two said movable hook members including a slidable bracket inside the expansion module bearing the movable hook members and reciprocable between an engaged position and a disengaged position of the movable hook members, the slidable bracket being integral with the spring means, the movable hook members each having an inclined surface engageable with an edge of said hook receiving slot means to initially cam the movable hook members and bracket toward the disengaged position when the computer and expansion module are brought together.

5. A releasable connection between a computer and an expansion module or peripheral component for the computer, for mating the computer and expansion module closely and connecting them together electrically, comprising, the computer having a bottom surface and the expansion module having an upper surface which are complementarily shaped to each other such that the two surfaces can be nested closely together, stationary hook means protruding from the upper surface of the expansion module near a first end of the expansion module, first hook receiving slot means in the lower surface of the computer, in position corresponding to the position of the stationary hook means of the expansion module, such that the stationary hook means and the hook receiving slot means can be engaged when the computer and the module are nested together, at least one movable hook member protruding from the upper surface of the expansion module, near a second end of the module, the movable hook member being movable between an engaging position and a disengaging position, and spring means within the expansion module for biasing the movable hook member toward the engaging position, second hook receiving slot means in the bottom surface of the computer for receiving the movable hook member and for camming the hook member from the engaging position toward the disengaging position as the computer and expansion module are pivoted together following engagement of the stationary hook means with the computer, and including means associated with the movable hook member and the second hook receiving slot means for spring-forcing the movable hook member into a locking position in engagement with the computer when the computer and the expansion module have been moved fully into a nested position together, and bus connector means for automatically making a multiple-contact connection between the computer and the expansion module as the computer is brought into nesting contact with the expansion module, the bus connector means comprising a recess formed in the bottom of the computer;

a door movable between open and closed positions, wherein the recess is covered in the door's closed position and uncovered in the door's open position; and means for changing the operational state of the computer when the door moves from the closed position to the open position.

6. The connection structure of claim 5 wherein the means for changing comprises a switch disposed on the computer and a switch actuator disposed on the door.

7. A method for securing a computer to an expansion module or peripheral component for the computer, for mating the computer and expansion module closely and connecting them together electrically, comprising, providing on the computer a bottom surface and on the expansion module an upper surface which are complementarily shaped to each other such that the two surfaces can be nested closely together, holding the computer and module obliquely with respect to teach other and engaging a pair of stationary hooks at a first end of the upper surface of the module into corresponding slots in the bottom surface of the computer, swinging the bottom surface of the computer toward the upper surface of the module and thereby causing a bus connection automatically to be made between the computer and the module, via a bus connector extending up from the modules' upper surface and a mating bus connector within a recess in the computer's bottom surface, and continuing to bring the computer into nesting contact with the expansion module, until a spring-biased movable hook member extending from an integrally formed slidable bracket inside the module engages with a corresponding latching slot at a second end of the bottom surface of the computer and becomes spring-forced into a latched position to firmly and closely hold the computer in engagement with the expansion module, the bracket including a spring formed integrally with the hook member and bracket.

8. The method of claim 7, including two said movable hook members, the slidable bracket bearing the movable hook members and reciprocable between an engaged position and a disengaged position of the movable hook members, the integral spring biasing the bracket and movable hook members toward the engaged position, the movable hook members each having an inclined surface engageable with an edge of the corresponding latching slot of the computer to initially cam the movable hook members and bracket toward the disengaged position when the computer and expansion module are brought together.

9. A releasable connection between two pieces of electronic equipment for connecting them together electrically, comprising, a first housing having a bottom surface and a second housing having an upper surface which are complementarily shaped to each other such that the two surfaces can be nested closely together, stationary hook means protruding from the upper surface of the second housing near a first end of the second housing, first hook receiving slot means in the lower surface of the first housing, in position corresponding to the position of the stationary hook means of the second housing, such that the stationary hook means and the hook receiving slot means can be engaged when the second and first housings, respectively, are nested together, at least one movable hook member protruding from the upper surface of the second housing, near a second end of the second housing, the movable hook member being movable between an engaging position and a disengaging position, and spring means within the second housing for biasing the movable hook member toward the engaging position, the spring means and the hook member forming an integral element, second hook receiving slot means in the bottom surface of the first housing for receiving the movable hook member and for camming the hook member from the engaging position toward the disengaging position as the first housing and second housing are pivoted together following engagement of the stationary hook means with the first housing, and including means associated with the movable hook member and the second hook receiving hook receiving slot means for spring-forcing the movable hook member into a locking position in engagement with the first housing, when the first and second housings have been moved fully into a nested position together, and means for automatically making an electrical connection between the first and second housings as the first housing is brought into nesting contact with the second housing.

10. The connection structure of claim 9, wherein the first housing's bottom surface and the second housing's upper surface are both substantially planar.

11. The connection structure of claim 9, wherein the stationary hook means comprise a pair of stationary hook members protruding from the second housing, generally L-shaped as viewed from a side of the second housing, and wherein the corresponding first hook receiving slot means in the bottom of the first housing are so configured that the first and second housings must be oriented obliquely with respect to one another in order to engage the stationary hook members into the corresponding slot means.

12. The connection structure of claim 9, including two said movable hook members and including a slidable bracket inside the second housing bearing the movable hook members and reciprocable between an engaged position and a disengaged position of the movable hook members, the slidable bracket being integral with the spring means, the movable hook members each having an inclined surface engageable with an edge of said second hook receiving slot means to initially cam the movable hook members and bracket toward the disengaged position when the first and second housings are brought together.

13. A releasable connection between two pieces of electronic equipment for connecting them together electrically, comprising,
- a first housing having a bottom surface and a second housing having an upper surface which are complementarily shaped to each other such that the two surfaces can be nested closely together,
- stationary hook means protruding from the upper surface of the second housing near a first end of the second housing,
- first hook receiving slot means in the lower surface of the first housing, in position corresponding to the position of the stationary hook means of the second housing, such that the stationary hook means and the hook receiving slot means can be engaged when the second and first housings, respectively, are nested together,
- at least one movable hook member protruding from the upper surface of the second housing, near a second end of the second housing, the movable hook member being movable between an engaging position and a disengaging position, and spring means within the second housing for biasing the movable hook member toward the engaging position,
- second hook receiving slot means in the bottom surface of the first housing for receiving the movable hook member and for camming the hook member from the engaging position toward the disengaging position as the first and second housings are pivoted together following engagement of the stationary hook means with the first housing, and including means associated with the movable hook member and the second hook receiving slot means for spring-forcing the movable hook member into a locking position in engagement with the first housing when the first and second housings have been moved fully into a nested position together, and
- means for automatically making an electrical connection between the first and second housings as the first housing is brought into nesting contact with the second housing, the means for automatically making an electrical connection comprising:
- a recess formed in the bottom of the first housing;
- a door movable between open and closed positions, wherein the recess is covered in the door's closed position and uncovered in the door's open position; and
- means for changing the operational state of the electronic equipment when the door moves from the closed position to the open position.

14. The connection structure of claim 13 wherein the means for changing comprises a switch disposed within the first housing and a switch actuator disposed on the door.

* * * * *